US010616616B2

(12) United States Patent
Kandov et al.

(10) Patent No.: US 10,616,616 B2
(45) Date of Patent: Apr. 7, 2020

(54) METHOD AND SYSTEM FOR STREAMING A MEDIA FILE DURING A CONCURRENT TRANSCODING THEREOF

(71) Applicant: NICE LTD, Ra'anana (IL)

(72) Inventors: Reuven Kandov, Kfar Saba (IL); Tal Haguel, Kfar Saba (IL)

(73) Assignee: NICE LTD, Ra'anana (IL)

( * ) Notice: Subject to any disclaimer, the term of this patent is extended or adjusted under 35 U.S.C. 154(b) by 234 days.

(21) Appl. No.: 15/859,669

(22) Filed: Jan. 1, 2018

(65) Prior Publication Data

US 2019/0208241 A1   Jul. 4, 2019

(51) Int. Cl.
| | | |
|---|---|---|
| H04N 21/2343 | (2011.01) | |
| H04N 21/2387 | (2011.01) | |
| H04N 21/845 | (2011.01) | |
| H04N 21/472 | (2011.01) | |
| H04N 21/432 | (2011.01) | |

(52) U.S. Cl.
CPC . *H04N 21/234309* (2013.01); *H04N 21/2387* (2013.01); *H04N 21/47217* (2013.01); *H04N 21/8456* (2013.01); *H04N 21/4325* (2013.01)

(58) Field of Classification Search
None
See application file for complete search history.

(56) References Cited

U.S. PATENT DOCUMENTS

| 8,955,027 B1 | 2/2015 | Dong et al. | |
|---|---|---|---|
| 2003/0177503 A1* | 9/2003 | Sull | G06T 3/4092 |
| | | | 725/112 |
| 2013/0219074 A1 | 8/2013 | Dahl et al. | |
| 2013/0276048 A1* | 10/2013 | Krasic | H04N 21/2187 |
| | | | 725/116 |
| 2014/0013342 A1* | 1/2014 | Swan | H04N 21/2343 |
| | | | 725/5 |
| 2014/0177700 A1 | 6/2014 | Schmidt | |
| 2016/0344789 A1 | 11/2016 | Watts et al. | |

FOREIGN PATENT DOCUMENTS

| CN | 102055965 A | 5/2011 |
|---|---|---|
| CN | 105992018 A | 10/2015 |

OTHER PUBLICATIONS

Media Fragments URI 1.0 (basic) W3C Recommendation Sep. 25, 2012 (Year: 2012).*

* cited by examiner

*Primary Examiner* — June Y Sison
(74) *Attorney, Agent, or Firm* — Soroker Agmon Nordman

(57) ABSTRACT

A method includes receiving from a user a request to play a media file on a media player operating on a client terminal, where the media file is coded with a first coding format incompatible with the media player. The media file is transcoded from the first coding format to a transcoded media file in a second coding format compatible with the media player, and streaming the transcoded media file over a communication network to the media player concurrently during transcoding by transcoding a data chunk from a plurality of data chunks related to the media file respectively to a transcoded data fragment. The transcoded data fragment is sent for stream viewing on the media player while transcoding a next data chunk from said plurality of data chunks. The transcoded data fragments are written to the transcoded media file and stored in a memory.

20 Claims, 5 Drawing Sheets

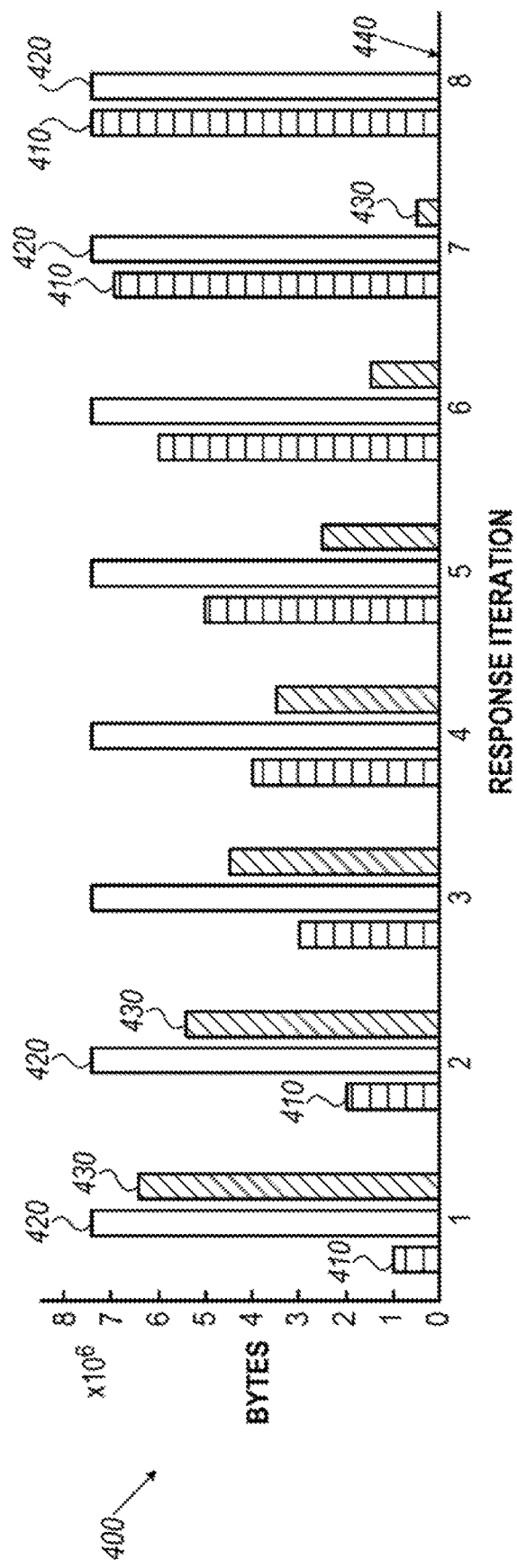
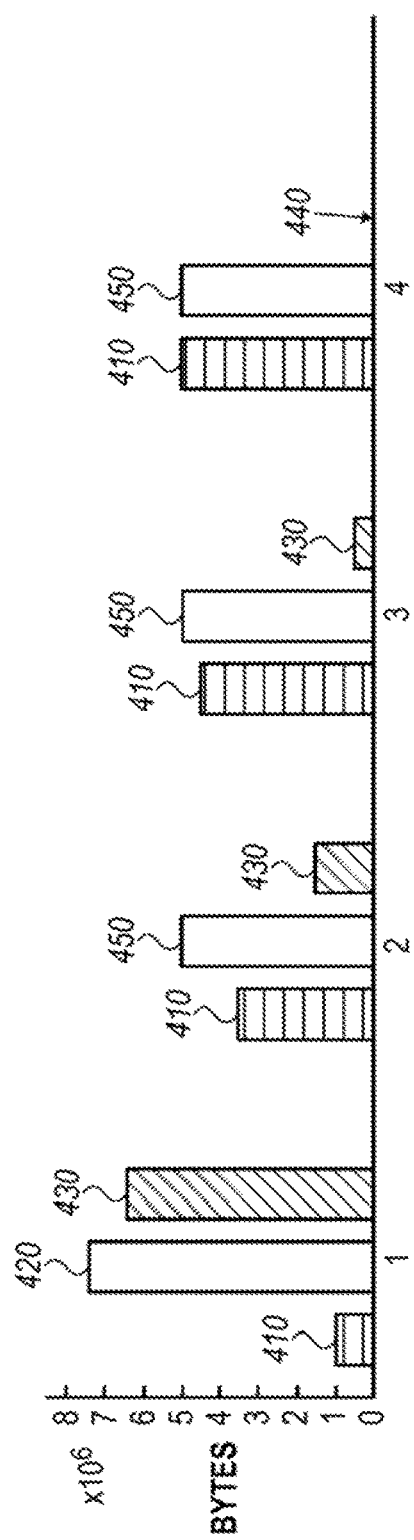
FIG. 5A
FIG. 5B

METHOD AND SYSTEM FOR STREAMING A MEDIA FILE DURING A CONCURRENT TRANSCODING THEREOF

FIELD OF THE INVENTION

The present invention relates to media streaming, and more specifically a method and system for streaming a media file for playback on a media player during a concurrent transcoding thereof.

BACKGROUND OF THE INVENTION

Media files may be presented to users via web pages of various web browsers. Web pages may be written in Hypertext Markup Language (HTML), where HTML may support many different coding formats of media files. For example, HTML5 supports an MP4 video container with MPEG4 coding format (e.g., H264 codec), which is a standard-codec that is used to process audio or video data, by web browsers. HTML5 media players may be embedded in a web page or as a stand-alone application that may be executed on the graphic user interface. Prior to the introduction of HTML5, a media file may be played on a web browser using an installed plug-in, such as Flash player, for example.

Media files may be created with a coding format, that is not supported by HTML5 players, such as with proprietary codecs, legacy codecs, or non-standard codecs, such as media files encoded with Nice Media Format (NMF). In some usage cases, such as with a customer call center, for example, a plurality of calls may be recorded and stored in media files in various audio and/or video formats in a database. In order to playback these format-incompatible files on a standard HTML5 media player in a web browser operating on client terminal, the media file must be transcoded to an MP4 format container for playback on an HTML5 media player.

In one usage scenario, a user at a client terminal may request to fetch a media file for streaming playback on an HTML5 media player, for example, that may be stored on a storage device at a remote location in an incompatible format. The system may be configured to fetch the file from the database, transcode the media file from the incompatible first format to the second format such as H264, compatible with HTML5 media players. From the time that the user activated the PLAY function (e.g., to initiate playback) on the HTML5 media player to the time that the user starts to see the video streaming on the HTML5 player, may take several minutes. This time delay is the time needed the time to transcode the entire media file container, depending on the format, video resolution, and video duration. This scenario may present the user with a bad user experience.

Thus, it may be desirable to have a media playback system whereby the media file in an incompatible format may be fetched from the database, and streamed for playback to the video player while concurrently transcoding the media file from the incompatible coding format to the format compatible with the media player.

SUMMARY OF THE INVENTION

There is thus provided, in accordance with some embodiments of the present invention, a method for streaming a media file for playback on a media player during a concurrent transcoding thereof. The method may include in a processor in a server, receiving from a user a request to playback a media file on a media player operating on a client terminal, where the media file is coded with a first coding format incompatible with the media player. The media file may be transcoded from the first coding format to a transcoded media file in a second coding format compatible with the media player, and streaming the transcoded media file over a communication network to the media player concurrently during transcoding, which may include steps of:

(a) transcoding a data chunk from a plurality of data chunks related to the media file from the first coding format respectively to a transcoded data fragment in the second coding format with a start position and an end position for positioning the transcoded data fragment in the transcoded media file relative to a beginning of the transcoded media file (b) sending the transcoded data fragment over the communication network for stream viewing on the media player while transcoding a next data chunk from said plurality of data chunks;

(c) writing the transcoded data fragment into the transcoded media file in accordance with the start position and the end position relative to the beginning of the transcoded media file; and (d) repeating step (a) to step (c) until all data chunks from said plurality of data chunks are transcoded to the second coding format and all respective transcoded data fragments are consecutively written into the transcoded media file. The transcoded media file may be stored in a memory.

Furthermore, in accordance with some embodiments of the present invention, the media player may include an HTML5 player.

Furthermore, in accordance with some embodiments of the present invention, the first coding format may be selected from the group consisting of an NMF format, a standard codec, and a proprietary codec.

Furthermore, in accordance with some embodiments of the present invention, the second coding format may include an H264 format.

Furthermore, in accordance with some embodiments of the present invention, the transcoded media file may include a fragmented MP4 file.

Furthermore, in accordance with some embodiments of the present invention, a size of the transcoded data fragment is related to a bit rate of the media file.

Furthermore, in accordance with some embodiments of the present invention, the method may include updating the beginning of the transcoded media file in accordance with a seek time set by the user.

Furthermore, in accordance with some embodiments of the present invention, the method may include sending an approximate file length of the transcoded media file and a time duration of the media file to the media player upon receiving the request.

Furthermore, in accordance with some embodiments of the present invention, the method may include sending an updated URL to the client terminal when all transcoded data fragments are written into the transcoded media file specifying a storage location of the transcoded media file.

Furthermore, in accordance with some embodiments of the present invention, the updated URL may permit the playback of a fragmented transcoded media file.

There is further provided, in accordance with some embodiments of the present invention, a server for streaming a media file for playback on a media player during a concurrent transcoding thereof. The server may include a memory and a processor. The processor may be configured to receive from a user a request to playback a media file on a media player operating on a client terminal, where the media file is coded with a first coding format incompatible with the media player, to transcode the media file from the first coding format to a transcoded media file in a second coding format compatible with the media player, and streaming the transcoded media file over a communication network to the media player concurrently during transcoding, which may include steps of:

(a) transcoding a data chunk from a plurality of data chunks related to the media file from the first coding format respectively to a transcoded data fragment in the second coding format with a start position and an end position for positioning the transcoded data fragment in the transcoded media file relative to a beginning of the transcoded media file;

(b) sending the transcoded data fragment over the communication network for stream viewing on the media player while transcoding a next data chunk from said plurality of data chunks;

(c) writing the transcoded data fragment into the transcoded media file in accordance with the start position and the end position relative to the beginning of the transcoded media file; and (d) repeating step (a) to step (c) until all data chunks from said plurality of data chunks are transcoded to the second coding format and all respective transcoded data fragments are consecutively written into the transcoded media file. The transcoded media file may be stored in the memory.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 5A is a diagram illustrating the change in a size of a transcoded media file in a normal playback mode during concurrent playback and transcoding iterations, in accordance with some embodiments of the present invention; and FIG. 5B is a diagram illustrating the change in a size of a transcoded media file in a seek-to-time playback mode during concurrent playback and transcoding iterations, in accordance with some embodiments of the present invention.

DETAILED DESCRIPTION OF THE INVENTION

Figure 1:
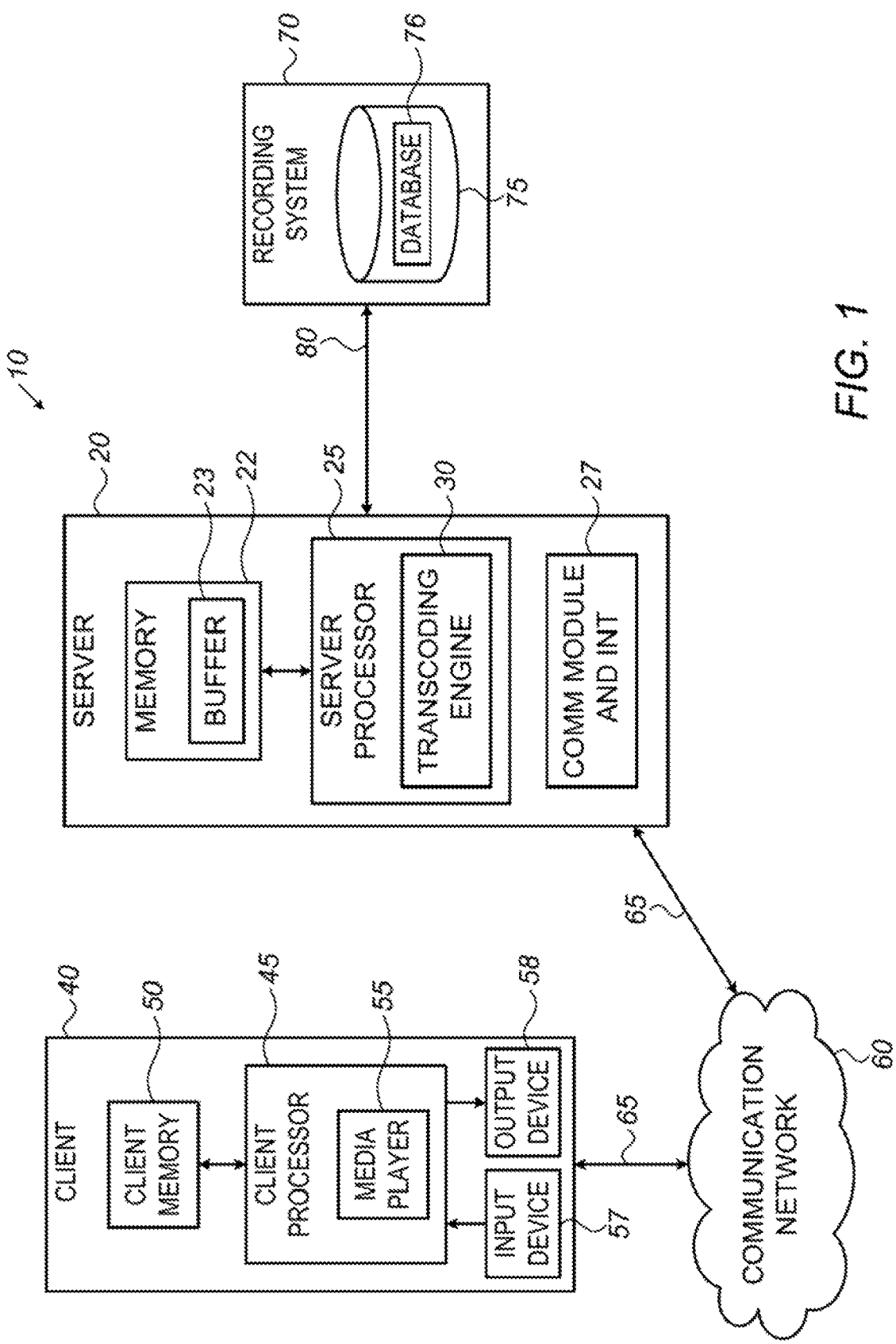
FIG. 1 is a block diagram of a system for streaming a media file for playback on a media player during a concurrent transcoding thereof, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present invention herein describe a system for streaming a media file for playback on a media player on a client terminal. However, the media file may be stored, for example, in a memory of a server or other remote database in a first coding format that is incompatible with the media player. In order for a user to view the media file on the media player, the media file may be transcoded from the first coding format to a second coding format compatible with and allowing playback on the media player. However, typically the media file needs to be transcoded entirely before the file may be viewed on the media player as a completed or "closed" file, or container.

The embodiments described herein provide a system and a method for streaming a media file in a second coding format for playback on a media player while concurrently transcoding the media file from the first coding format to the second coding format. In this manner, the user may be able to view the video upon pushing "play" on the media player, for example, without having to wait for the entire media file to finish transcoding. Thus, the embodiments taught herein are an improvement to a computer-related technology, namely media streaming technology, enabling stream viewing of a media file previously stored in an incompatible format on a media player concurrently while piece-wise transcoding the media file from the incompatible first coding format to the second coding format compatible with the media player.

The embodiments taught herein improve the user experience for viewing the media file with a streaming playback without having to wait for the media file to finish transcoding. In addition, a transcoded file of the original media file may be saved in the second coding format such that any future requests for playback of the same file on the media player will not require re-transcoding the media file again to effectively improve the computational efficiency of the computer itself in subsequently playback requests of the same file.]

FIG. 1 is a block diagram of a system 10 for streaming a media file for playback on a media player 55 during a concurrent transcoding thereof, in accordance with some embodiments of the present invention. System 10 may include a client 40, or client terminal, a server 20, and a recording system 70. In some embodiments, recording system 70 may be remote from server 20. Recording system 70 may include a data storage device 75 with a database 76. Recording system 70 may be configured to communicate 80 and relay data between server 20 by any suitable means (e.g., wired connection, wireless connection, or both). In other embodiments, server 20 may include recording system 70. In yet other embodiments, system 10 may include client 40, server 20 and recording system 70 in one stand-alone unit.

Client 40 may include a client processor 45, a client memory 50, and an input device 57, and output device 58. Client processor 45 may execute software of media player 55. A user at client terminal 40 may instruct media player 55 to playback a media file such that the user may view the playback on media player 55. Media player 55 may include a graphic user interface on output device 58 with a timeline, or timecode, or timestamp for observing a playing time of the media file during playback. The timeline may include a scroll bar which may allow the user to scroll the media file forward in a seek mode to start viewing the media file at a particular playback time, or seek time, after the start of the media file, typically after time t=0, for example.

Server 20 in system 10 may include a server processor 25, a memory 23 with a memory buffer 23, and a communication module and interface 27. Server processor 25 may execute software such as a transcoding engine 30 for transcoding the media file using buffer 23 in memory 22 to process the media file data from the first coding format to the second coding format. Data, such as the transcoded data may be relayed or sent 65 over a communication network 60 to client 40 for playback on media player 55. Client 40 may relay 65 instructions and data over communication network 60 to server 20.

Recording system 70 may record a plurality of call interactions and store the plurality of call interactions in a respective plurality of media files in database 76 on data storage device 75. The plurality of call interactions may be stored in a media file whose coding format may not be compatible with media player 55. Stated differently, media player 55 may be incapable of playing back the media file until the coding format is changed. For example, if an HTML5 player is used as media player 55, the media file should be coded in an H264 format (e.g., fragmented MP4 media file) to be viewed by the HTML5 media player, or the media file will not be viewable by the HTML5 media player. However, in this case, server processor 25 may transcode the media file from any media format (codec) to H.264 format for viewing and streaming on the HTML5 media player.

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

System 10 may be configured to allow playback of one or more non-standard codec files, i.e. source media files, on client processor 45 while concurrently transcoding the source media file on server processor 25. System 10 may include server processor 25 and client processor 45. Server processor 25 and client processor 45 may each include one or more processing units, e.g. of one or more computers. Server processor 25 and client processor 45 may be configured to operate in accordance with programmed instructions stored respectively in server memory 22 and client memory 50.

Media player 55 may be a stand-alone program, embedded in a web browser, or both, operating on client 40. Media player 55 may playback the media file on the graphic user interface display on output device 58. A standard codec file, or compatible media file, is a media file that may be supported by media player 55 and capable of being played back with no additional transcoding. An incompatible media file may require transcoding before viewing on media player 55.

Client processor 45 may be capable of executing an application for receiving a request from the user of a non-standard codec file to playback the file on media player 55 and sending the request to server processor 25 via communication network 60. Server processor 25 may fetch the requested media file from database 76 on recording system 70 and/or from client memory 50 and/or from server memory 22.

Client processor 45 may communicate with output device 58. For example, output device 58 may include a computer monitor or screen for the user to view and interact with media player 55. Client processor 45 may communicate with a screen of output device 58 to display media player 55. In another example, output device 58 may include a printer, display panel, speaker, or another device capable of producing visible, audible, or tactile output.

Client processor 45 may communicate with input device 57. For example, input device 57 may include one or more of a keyboard, keypad, or pointing device for enabling a user to inputting data or instructions for operation of client processor 45. In some embodiments, server 20 may also include input and output devices similarly for those shown for client 40 in FIG. 1.

Server processor 25 may be configured to transcode portions of the media file with a non-standard codec incompatible with media player 55 to a standard codec compatible with and allowing playback on media player 55. Server processor 25 may send 65 or stream the already transcoded portions via communication network 60 for stream viewing on media player 55 running on client processor 45, while concurrently transcoding subsequent un-transcoded portions of the source media file in the non-standard codec file to a standard codec.

Server processor 25 may communicate with client 40. Additionally, server processor 25 may communicate 80 with data storage device 75 to retrieve the non-standard codec file or to store fragments of the transcoded source file for future retrieval from database 76, for example. In other embodiments, database 76 may be stored in server memory 22.

Server processor 25 and client processor 45 may respectively communicate with server memory 22 and client memory 45. Server memory 22 and client memory 45 may each include one or more volatile or nonvolatile memory devices. Server memory 22 and client memory 45 may each be utilized to store, for example, programmed instructions for respective operation of server processor 25 and client processor 45, data or parameters for use by processor 12 during respective operations, or results of operations of server processor 25 and client processor 45. The programmed instructions may take the form of transcoding engine 30 to enable playing a non-standard codec file on the client 40 while transcoding said file to a standard codec compatible with media player 55.

In operation, server processor 25 may execute a method enabling playback of non-standard codec file on media player 55 on client 40 in response to a playback request on client 40. Server processor 25 may execute a seek function to as to start streaming playback of the media file at a time different from the start of the media file, while transcoding said file to a standard codec using transcoding engine 30 on server 20.

In some embodiments of the present invention, when a user at client 40, such as an HTML client, requests to playback a media file on media player 55, client processor 45 may send the request over communication network 60 to server processor 25 in server 20 (e.g., a media service server, for example). In response, server processor 25 may return the location of the file, for example, in server memory 22 or database 76 in data storage device 75 in recording system 70. Server processor 25 may return the metadata information such as a playlist, information regarding the location of the file, and a uniform record locator (URL) with the path to the source media file. For example, database 76 may relay the duration of the media file (e.g., the duration is guttered.)

Standard URL playback requests from HTML clients (e.g., HTML5 media players), for example, typically points to a file to fetch and playback, where the file cannot be played-back piece-wise, but only in a closed file, or closed container. In some embodiments, the standard functions associated with the playback URL were modified so to override the standard playback function in the media player requiring playback of a closed file only, so as to permit playback streams of data fragments after transcoding by transcoding engine 30. The standard playback function of the media player may wait for the footer of the media file before initiating playback. Overriding the default playback mode may include not waiting for the footer to initiating playback. This will permit the playback of fragmented MP4 media files, for example.

In some embodiments of the present invention, server 20 will transcode data chunks related to the source media file piece-wise to a second coding format such as a fragmented MP4 file, and stream the transcoded pieces or data fragments to media player 55. While the data fragments are streamed back to media player 55, a next data chunk from the media source may be transcoded while concurrently concatenating the already transcoded data fragments to a transcoded media file which is not in a closed file, or container. After completion of converting the entire source media file in the first coding format incompatible with the media player to a transcoded media file in the second coding format (e.g., fragmented MP4, for example) compatible with the media player (e.g., HTML5 media player), server 20 may return an updated URL to the location of the fragment MP4 file (e.g., the transcoded media file) with the functionality of the standard URL overridden to so permit playback of the fragmented media file.

Media file may include any audio, video, multimedia file in any format, or container with a first coding format incompatible with media player 55. A data chunk herein may refer to a portion or a subset of the data in the media file prior to transcoding. The media file may be sliced, or divided, or parcellated into the data chunks. The arrangement of the data in the media file may be indicated in the metadata of the media file. The position of the data chunks in the media file (e.g., prior to transcoding) related to a particular video frame, for example, along the timeline or timecode of the media file during playback may be located in arbitrary, non-contiguous positions, but addressed and mapped in the metadata of the media file. The data chunks may include the data to recreate the audio or video frames when decoded by the media player as well as a header which may further include the coding format, the type of media container, and the size of the chunk, for example, and a footer to signify the end of the media file.

Similarly, a data fragment or a transcoded data fragment herein refers to and corresponds to a data chunk that was transcoded. The data stream to be sent by server 20 to media player 55 on client 40 may include a series of non-overlapping data fragments which were transcoded in and held in buffer 23.

The file size of a data chunk and a file size of a corresponding transcoded data fragment may be different due to the different coding schemes. However, a plurality of data chunks from the parcellated media source file may have the same size, whereas the respective plurality of transcoded data fragments may have the same size.

Figure 2:
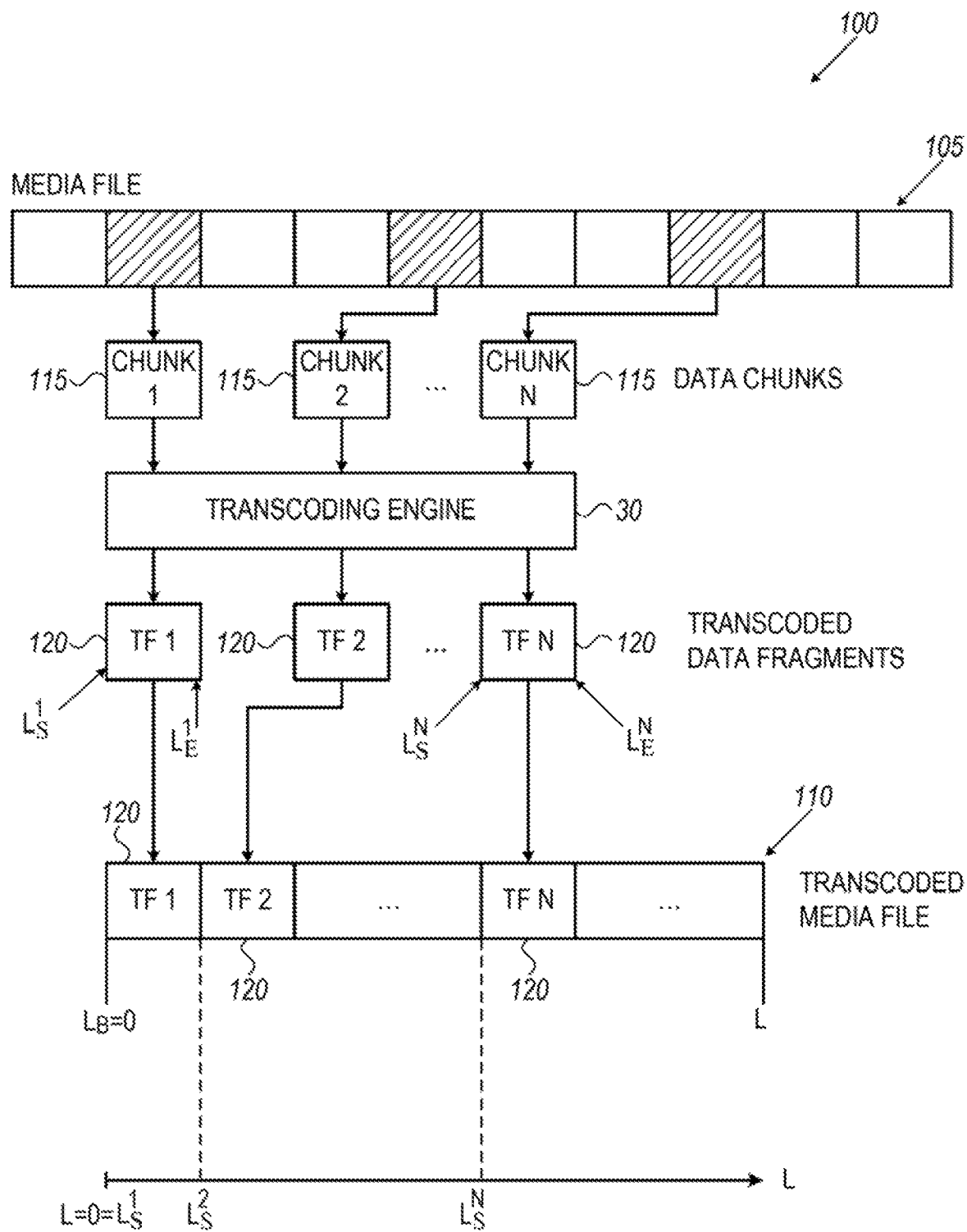
FIG. 2 is a diagram illustrating transcoding data chunks of a media file, in accordance with some embodiments of the present invention.

FIG. 2 is a diagram illustrating transcoding data chunks 115 of a media file 105, in accordance with some embodiments of the present invention. Media file 105 may be stored in the first coding format. When the user requests to playback media file 105, server processor 25 may fetch media file 105 from database 76, for example, or from wherever the file may be stored such as memory 22.

Server processor 25 may examine the metadata of media file 105, so as to obtain parameters such as the duration of the media file, the coding format, video resolution, and the file size of media file 105. Server processor may slice media file 105 into a plurality of N-data chunks 115 where N is an integer and each of the data chunks are denoted CHUNK1, CHUNK2, ... CHUNKN. Each data chunk may represent a different portion or a different frame of the audio and/or video playback prior to transcoding into the second coding format compatible with media player 55.

Transcoding engine 30 in server processor 25 may use buffer 23 to transcode each of data chunks 115 respectively to a transcoded data fragment 120 denoted TF1, TF2, TFN. The size of each respective data fragment 120 may be equal to the size of buffer 23. The size of buffer 23 may be computed as the media bit rate in one second. The bit rate is a measure of the media file quality (e.g., video quality, for example). The bit rate is higher for a high definition video relative to a low definition video, for example.

In some embodiments of the present invention, transcoding engine 30 may transcode N-th data chunk 115 respectively to N-th transcoded data fragment 120 in buffer 23. Transcoding engine 30 may compute a start position $L_S^N$ and an end position $L_E^N$, as shown in FIG. 2 for positioning N-th transcoded data fragment 120 in the transcoded media file relative to a beginning $L_B$ of transcoded media file 110 with a length in bytes denoted L as shown in FIG. 2. As data chunks 115 are transcoded to transcoded data fragments 120, transcoding engine 30 successively writes transcoded data fragments 120 or concatenates them in transcoded media file 110 as shown in the sequence TF1, TF2, ... TFN ... in FIG. 2 in accordance with their start and end positions.

In some embodiments of the present invention, server processor 25 may be configured to send the $N^{th}$ transcoded data fragment TFN over communication network 60 for stream viewing on media player 55 while transcoding a next data chunk CHUNK(N+1) to transcoded data fragment TF(N+1). In this manner, as the user sends a request to playback media file 105 in an incompatible format playback on media player 55, the user may almost immediately view a streaming of successive transcoded data fragments without having to wait for entire media file 105 to transcode into the second coding format.

In some embodiments of the present invention, server processor 25 may use a content length response whereby the approximate (byte) size of transcoded media file 110 and the content time duration from the metadata of media file 105 may be sent to media player 55. Media player 55 may reference time points on the time line in time units of seconds, for example, or equivalently in file size units of bits, or typically byte units, by proportionally applying the time duration of the media file and approximate file size of transcoded media file. Thus, any media source file in any suitable coding format may be use the embodiments presented herein so long as the duration of the media file and the video resolution may be obtained.

In some embodiments, when the transcoding ends, the time duration of transcoded media file 110 may be updated with the actual time duration after the transcoding process terminates. Furthermore, as more of the data chunks in the first coding format are transcoded to data fragments in the second coding format and concatenated, the approximated (byte) file size of the transcoded media file approaches the actual file size of the transcoded media file. Accordingly, in other embodiments, server processor 25 may periodically apply corrections to the approximated (byte) file size of the transcoded media file during transcoding, so as to adjust the mapping between time points on the time line to start and end position in bytes of transcoded media file 110.

Thus, server processor 25 in the server backend (e.g., server 20) may transcode the data chunks to data fragments expressed in file size units such as bytes with start and end positions in bytes signifying their position in transcoded media file 110. For example, transcoding engine 30 may start transcoding a sequence of data chunks to respective sequence data fragments from 0-1000 bytes, 1000-2000 bytes, and so forth, until the end of the file and may stream this sequence of data fragments sequentially to media player 55. In some embodiments, sending a data fragment of 0 byte length to media player 55 may signify the end of the streaming playback.

The terms start position, end position, and beginning ($L_B$) of the transcoded media file may be used interchangeably with the terms of start byte position, end byte position, and beginning byte position ($L_B$). "Byte" may be replaced with "bit" if the file size units are in bits.

Figure 3:
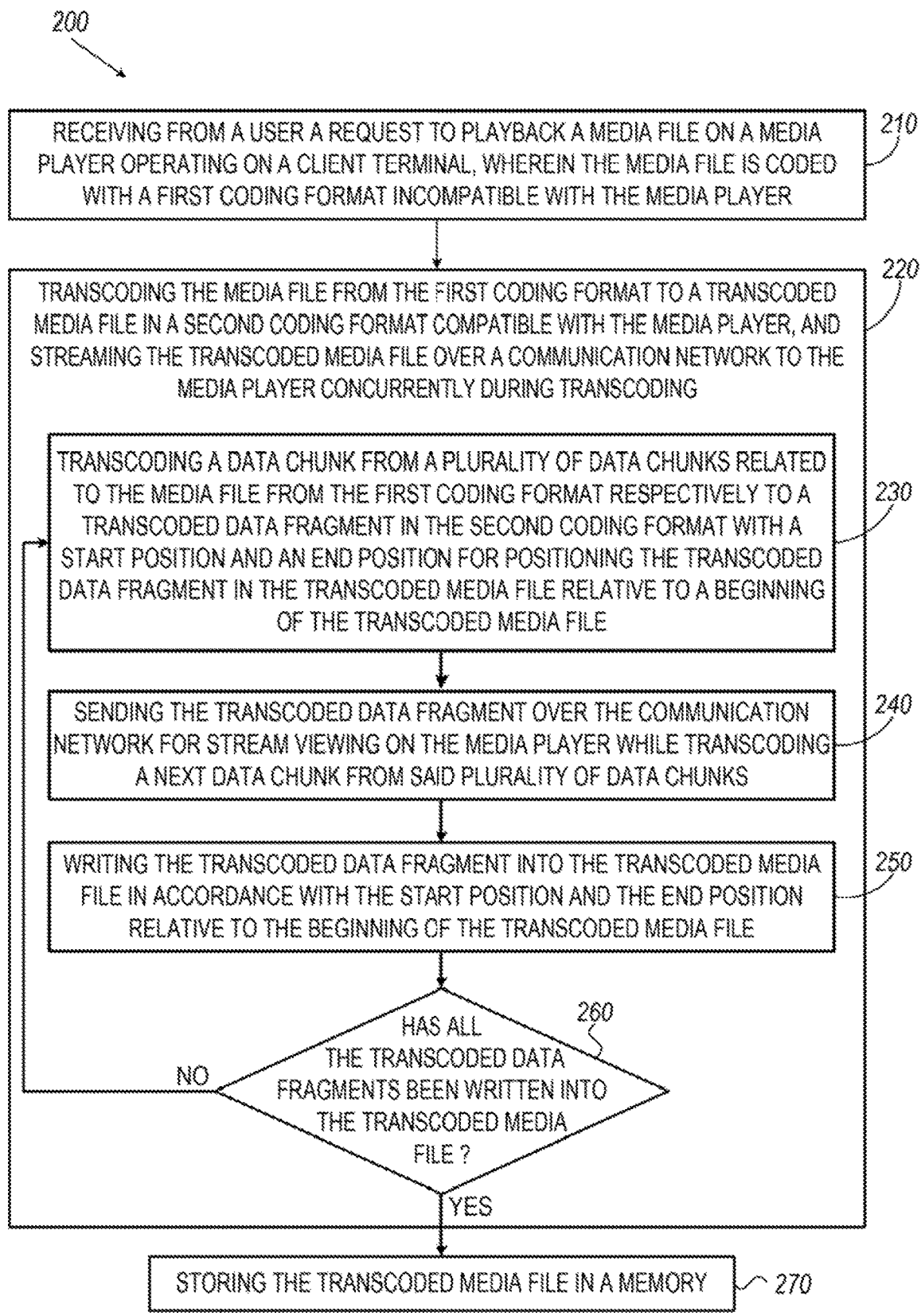
FIG. 3 is a flowchart illustrating a method for streaming a media file for playback on a media player during a concurrent transcoding thereof, in accordance with some embodiments of the present invention.

FIG. 3 is a flowchart illustrating a method 200 for streaming media file 105 for playback on media player 55 during a concurrent transcoding thereof, in accordance with some embodiments of the present invention. Method 200 may be performed on server processor 25.

Method 200 may include receiving 210 from a user a request to playback media file 105 on media player 55 operating on client terminal 40, where media file 40 is coded with a first coding format incompatible with the media player 55.

Method 200 may include transcoding 220 media file 105 from the first coding format to transcoded media file 110 in a second coding format compatible with media player 55, and streaming transcoded media file 110 over communication network 60 to media player 55 concurrently during transcoding media file 105 in transcoding engine 30.

Method 200 may include transcoding 230 data chunk 115 from a plurality of data chunks related to media file 105 from the first coding format respectively to transcoded data fragment 120 in the second coding format with a start position and an end position (e.g., $L_S^N$ and $L_E^N$ of the N-th transcoded data fragment) for positioning transcoded data fragment 120 in transcoded media file 110 relative to a beginning ($L_B$) of transcoded media file 110.

Method 200 may include sending 240 transcoded data fragment 120 over communication network 60 for stream viewing on media player 55 while transcoding a next data chunk from said plurality of data chunks.

Method 200 may include writing 250 transcoded data fragment 120 into transcoded media file 110 in accordance with the start position ($L_S^N$) and the end position ($L_E^N$) relative to the beginning ($L_B$) of transcoded media file 110.

Method 200 may include a decision step 260 to assess if all the transcoded data fragments have been written into transcoded media file 110. If so, method 200 may include storing 280 transcoded media file 110 in memory 22. If not, transcoding of the plurality of data chunks 115 continues at step 230.

Figure 4:
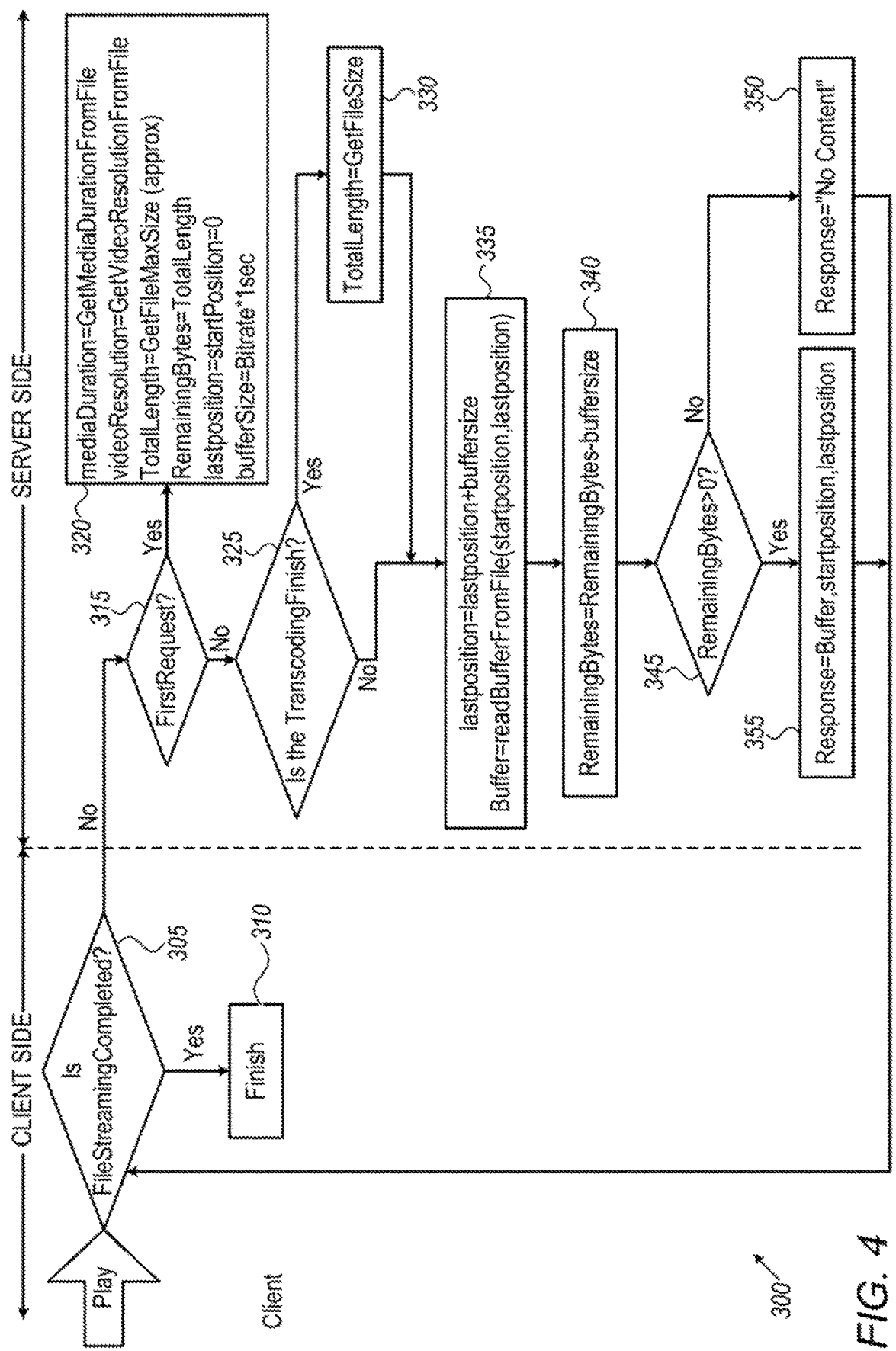
FIG. 4 is a flowchart of an algorithm for streaming a media file for playback on a media player during a concurrent transcoding thereof, in accordance with some embodiments of the present invention.

FIG. 4 is a flowchart of an algorithm 300 for streaming media file 105 for playback on media player 55 during a concurrent transcoding thereof, in accordance with some embodiments of the present invention. A user at client terminal 40 requests a playback of media file 105 on media player 55, for example, by pushing "PLAY". The request is sent via communication network 60 to server processor 25. In response, server processor 25 sends the total length (e.g., "TotalLength") of transcoded media file 110 to the client 40.

In a decision step 305, client processor 45 assesses whether the file streaming is finished by comparing the total size of all the transcoded data fragments that have been streamed to media player 55 and played back to the user to the total length of transcoded media file 110. If so, streaming is terminated in step 310. If not, server processor 25 assesses in a decision step 315 if the client is sending a first request for playback of media file 105. If yes, server processor 25 may read the metadata of media file 105, so as to obtain and/or calculate parameters in a box 320:

$$\text{mediaDuration=GetMediaDurationFromFile(in seconds)} \quad (1)$$

$$\text{videoResolution=GetVideoResolutionFromFile(in pixels)} \quad (2)$$

Server processor 25 then computes the initial value of "TotalLength" from (3), "RemainingBytes" from Eqn. (4), assigns "lastposition"="startPosition"=0 as in (5), and bufferSize=bitrate*1 sec.

$$\text{TotalLength=GetFileMaxSize( )=mediaDuration*videoResolution/8} \quad (3)$$

$$\text{RemainingBytes=TotalLength} \quad (4)$$

$$\text{lastposition=startPosition=0} \quad (5)$$

$$\text{bufferSize=Bitrate*1 sec} \quad (6)$$

The size of buffer 23 (e.g., bufferSize in (6)) is the bit rate in one second and the bit rate depends on the video resolution as described previously. This is the byte size of each of transcoded data fragments 120. Once server processor 25 computes the initial size estimate of a transcoded media file 110 (e.g., "TotalLength") from the media duration and the video resolution, "TotalLength" an initial approximation of the byte size of transcoded media file 110. This metric may be used, for example, on the client side to determine if the file streaming is completed.

Server processor 25 may then assess in a decision step 325 on the backend (e.g., in server 20), if the transcoding is finished or whether all data chunks 115 in the plurality of data chunks related to media file 105 have been transcoded. If so, the approximation of "TotalLength"="GetFileSize" in step 330 whereby "TotalLength" may be fixed to the actual length of transcoded media file 110 (e.g., L in FIG. 2). If not, "TotalLength" based on the approximate length using (3) may be used in the following computations.

In the embodiments of the present invention, the Total-Length of transcoded media file 110 may be used to compute $L_S^N$ and $L_E^N$ of the N-th transcoded data fragment. The byte size of buffer 23 may be used as the size of each of transcoded data fragment 120 such that bufferSize may be equal to $L_E^N - L_S^N$. Each transcoded data fragment 120 may be concatenated such that $L_S^1=0$, $L_E^1=L_S^2$, $L_E^2=L_S^3$, ... $L_E^{N-1}=L_S^N$, ... and so forth.

Stated differently, if server processor 25 assesses in decision step 325 that transcoding of a data chunk is not finished, an iterative loop may be used whereby in step 335, server processor 25 may execute:

$$\text{lastposition} = \text{lastposition} + \text{buffersize} \tag{7}$$

$$\text{Buffer} = \text{readBufferFromFile}(\text{startposition}, \text{lastposition}) \tag{8}$$

In terms of the designations of FIG. 2, algorithm 300 computes in (7) that $L_E^N = L_E^{(N-1)} + \text{buffersize}$. Server processor 25 transcodes data and loads the transcoded data in (8) between "startposition" and "lastposition" into buffer 23. In step 340, server processor 25 updates "RemainingBytes" or the number of remaining bytes of data from media file 105 to be transcoded reduced by the data loaded into buffer 23 (e.g., "buffersize").

$$\text{RemainingBytes} = \text{RemainingBytes} - \text{bufferSize} \tag{8}$$

Server processor 25 in a decision step 345 assesses if "RemainingBytes">0. If so, server processor 25 may stream the contents of buffer 23, or transcoded data fragment 120 between "startposition" and "lastposition", for playback on media player 55 on client 40 over communication network 60 in step 355.

$$\text{Response} = \text{Buffer}, \text{startposition}, \text{lastposition} \tag{9}$$

In the N-th iteration, server processor 25 may write the contents of buffer 23 between "startposition" and "lastposition", or $L_S^N$ and $L_E^N$ of the N-th transcoded data fragment to transcoded media file 110.

If "RemainingBytes"=0, then in step 350, the Response is "No Content" and client processor 45 on client 40 may assess in decision step 305 that the FileStreaming is completed. The File streaming process may finish or terminates in step 310.

In some embodiments of the present invention, the media file may be encoded to MP4 with the same frame rate as the fragmented MP4 file with the maximum bit rate according to the approximated file size.

FIG. 5A is a diagram 400 illustrating the change in a size of transcoded media file 110 in a normal playback mode during concurrent playback and transcoding iterations, in accordance with some embodiments of the present invention. An exemplary embodiment of algorithm 300 conceptually illustrates a size 430 of "RemainingBytes" (e.g., the remaining buffer), a size 410 of transcoded media file 110 (e.g., current accumulated buffer size) as each of the transcode data fragments 120 are written into transcoded media file 110 while concurrently being relayed over communication network 60 for playback on media player 55.

The exemplary embodiment of algorithm 300 shown in FIG. 5A may use the following parameters: a video resolution of 1280*780 pixel, a call duration of 60 seconds (e.g., duration of media file 105), and an approximate maximum size of transcoded media file 110 of 7.48 Mbytes. "TotalLength" may be computed using (3) as 60 sec*1280*780/8=7.48 Mbytes, which may be an approximation of the maximum MP4 file size in bytes, for example. The example shown in FIG. 5A is merely for conceptual clarity and not by way of limitation of the embodiments of the present invention.

FIG. 5A illustrates a bar graph representation of "RemainingBytes" size 430, "TotalLength", and transcoded media file size 410 are shown in eight exemplary concurrent transcoding/streaming (response) iterations. In the $8^{th}$ iteration, "RemainingBytes"=0 as shown by a gap 440. In the $8^{th}$ iteration, transcoded media file size 410 is equal to "TotalLength".

In some embodiments of the present invention, a user playing back media file 105 on media player 55 may decide to jump ahead and start viewing the media file at a particular seek time using a slide bar, or a scroll bar, for example, on the timeline of media player 55 to set the seek-to-time. Since client 40 received "TotalLength" of transcoded media file 110 upon initiating the playback along with the duration of media file 105, client processor 45 may compute the particular seek time in bytes proportionally using "TotalLength" and the duration of the media file 105. The seek time in bytes may be relayed to server processor 25 and request to start streaming transcoded data fragments from the particular seek time in bytes. Stated differently, $L_B$ of transcoded media file 110 may be adjusted not to start from byte 0 but from the particular seek time in equivalent bytes.

FIG. 5B is a diagram 405 illustrating the change in a size of transcoded media file 110 in a seek-to-time playback mode during concurrent playback and transcoding iterations, in accordance with some embodiments of the present invention. The exemplary embodiment of algorithm 300 shown in FIG. 5B may use the following parameters: a video resolution of 1280*780 pixel, a call duration of 60 seconds (e.g., duration of media file 105), and an approximate maximum size of transcoded media file 110 of 7.48 Mbytes. "TotalLength" may be computed using (3) as 60 sec*1280*780/8=7.48 Mbytes. The $1^{st}$ iteration as shown in FIG. 5B is equivalent to the $1^{st}$ iteration of FIG. 5A.

However, between the $1^{st}$ and $2^{nd}$ iterations, the user sets a seek to time of 20 second on media player 55. The seek time in bytes=7.48 Mbytes*(20/60)=2.49 Mbytes which updates the buffer position or equivalently $L_B$=2.49 Mbytes in FIG. 2. The new file size or "TotalLength" may be updated to 7.48-2.49=4.99 Mbytes. The example shown in FIG. 5B is merely for conceptual clarity and not by way of limitation of the embodiments of the present invention.

FIG. 5B illustrates a bar graph representation of the "TotalLength" size 420 prior to the user setting a seek time of 20 seconds in the $1^{st}$ iteration, a "TotalLength" size 450 after the user sets a seek time of 20 seconds in the $2^{nd}$ and subsequent iterations, and transcoded media file size 410 are shown in four exemplary concurrent transcoding/streaming (response) iterations. In the $4^{th}$ iteration, "RemainingBytes"=0 as shown by a gap 440. In the $4^{th}$ iteration, transcoded media file size 410 is equal to "TotalLength" size 450.

In some embodiment of the present invention, a method for streaming a media file for playback on a media player during a concurrent transcoding thereof may include in a processor in a server, receiving from a user a request to playback a media file on a media player operating on a client terminal, where the media file is coded with a first coding format incompatible with the media player. The media file may be transcoded from the first coding format to a transcoded media file in a second coding format compatible with the media player, and streaming the transcoded media file over a communication network to the media player concurrently during transcoding, which includes steps of:

(a) transcoding a data chunk from a plurality of data chunks related to the media file from the first coding format respectively to a transcoded data fragment in the second coding format with a start position and an end position for positioning the transcoded data fragment in the transcoded media file relative to a beginning of the transcoded media file;

(b) sending the transcoded data fragment over the communication network for stream viewing on the media player while transcoding a next data chunk from said plurality of data chunks;

(c) writing the transcoded data fragment into the transcoded media file in accordance with the start position and the end position relative to the beginning of the transcoded media file; and (d) repeating step (a) to step (c) until all data chunks from said plurality of data chunks are transcoded to the second coding format and all respective transcoded data fragments are consecutively written into the transcoded media file; and The transcoded media file may be stored in a memory.

In some embodiments of the present invention, the media player may include an HTML5 player.

In some embodiments of the present invention, the first coding format may be selected from the group consisting of an NMF format, a standard codec, and a proprietary codec. A standard codec in the context of this patent may include any coding format that cannot be played back by media player 55. Similarly, a proprietary codec may include any coding format that cannot be played back by media player 55 and may have limited availability due to ownership by a particular entity (e.g., company, organization, etc.).

In some embodiments of the present invention, the second coding format may include an H264 format.

In some embodiments of the present invention, the transcoded media file may include a fragmented MP4 file.

In some embodiments of the present invention, a size of the transcoded data fragment is related to a bit rate of the media file.

In some embodiments of the present invention, the method may include updating the beginning of the transcoded media file in accordance with a seek time set by the user.

In some embodiments of the present invention, the method may include sending an approximate file length of the transcoded media file and a time duration of the media file to the media player upon receiving the request.

In some embodiments of the present invention, the method may include sending an updated URL to the client terminal when all transcoded data fragments are written into the transcoded media file specifying a storage location of the transcoded media file.

In some embodiments of the present invention, the updated URL permits the playback of a fragmented transcoded media file.

In some embodiments of the present invention, a server for streaming a media file for playback on a media player during a concurrent transcoding thereof may include a processor and a memory. The processor may be configured to receive from a user a request to playback a media file on a media player operating on a client terminal, where the media file is coded with a first coding format incompatible with the media player, to transcode the media file from the first coding format to a transcoded media file in a second coding format compatible with the media player, and streaming the transcoded media file over a communication network to the media player concurrently during transcoding, which may include steps of:

(a) transcoding a data chunk from a plurality of data chunks related to the media file from the first coding format respectively to a transcoded data fragment in the second coding format with a start position and an end position for positioning the transcoded data fragment in the transcoded media file relative to a beginning of the transcoded media file;

(b) sending the transcoded data fragment over the communication network for stream viewing on the media player while transcoding a next data chunk from said plurality of data chunks;

(c) writing the transcoded data fragment into the transcoded media file in accordance with the start position and the end position relative to the beginning of the transcoded media file; and (d) repeating step (a) to step (c) until all data chunks from said plurality of data chunks are transcoded to the second coding format and all respective transcoded data fragments are consecutively written into the transcoded media file.

The processor may be configured to store the transcoded media file in a memory.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for streaming a media file for playback on a media player during a concurrent transcoding thereof, the method comprising:
    in a processor in a server, receiving from a client terminal a request for streaming a media file, wherein the request is sent responsive to a user request to playback a media file on a media player operating on the client terminal, and wherein the media file is coded with a first coding format that is not supported by the media player;
    upon retrieval of the media file, transcoding the media file from the first coding format to a transcoded media file in a second coding format that is supported by the media player, and streaming the transcoded media file over a communication network to the media player concurrently during transcoding, which comprises steps of:
        (a) reading metadata of the media file to retrieve media file duration and video resolution and calculating a total length of the transcoded media file as a division of a product of the media duration and the video resolution by a preconfigured value;
        (b) determining a size of remaining transcoded media file as the total length of the transcoded media file and a size of a transcoded data fragment according to a bit rate of the media file;
        (c) transcoding a data chunk from a plurality of data chunks related to the media file from the first coding format respectively to a transcoded data fragment in the second coding format with a start position and an end position for positioning the transcoded data fragment in the transcoded media file relative to a beginning of the transcoded media file;
        (d) reducing the calculated size of the transcoded data fragment from the size of remaining transcoded media file;
        (e) sending the transcoded data fragment over the communication network for stream viewing on the media player while transcoding a next data chunk from said plurality of data chunks;
        (f) writing the transcoded data fragment into the transcoded media file in accordance with the start position and the end position relative to the beginning of the transcoded media file; and
        (g) repeating step (c) to step (f) until the size of remaining transcoded media file equals zero and all data chunks from said plurality of data chunks are transcoded to the second coding format and all respective transcoded data fragments are consecutively written into the transcoded media file; and
    storing the transcoded media file in a memory.

2. The method according to claim 1, wherein the media player comprises an HTML5 player.

3. The method according to claim 1, wherein the first coding format is selected from the group consisting of an NMF format, a standard codec, and a proprietary codec.

4. The method according to claim 1, wherein the second coding format comprises an H264 format.

5. The method according to claim 1, wherein the transcoded media file comprises a fragmented MP4 file.

6. The method according to claim 1, further comprising updating the beginning of the media file in accordance with a seek time set by the user and updating the total length of the transcoded media file by reducing from the calculated total length of the transcoded media file the seek time in bytes.

7. The method according to claim 1, further comprising sending an approximate file length of the transcoded media file and a time duration of the media file to the media player upon receiving the request.

8. The method according to claim 1, further comprising sending an updated URL to the client terminal when all transcoded data fragments are written into the transcoded media file specifying a storage location of the transcoded media file.

9. The method according to claim 8, wherein the updated URL permits the playback of a fragmented transcoded media file.

10. A server for streaming a media file for playback on a media player during a concurrent transcoding thereof, the server comprising:
    a memory; and
    a processor configured to receive from a client terminal a request for streaming a media file, wherein the request is sent responsive to a user request to playback a media file on a media player operating on the client terminal, and wherein the media file is coded with a first coding format that is not supported by the media player, to retrieve the media file, to transcode the media file from the first coding format to a transcoded media file in a second coding format that is supported by the media player, and to stream the transcoded media file over a communication network to the media player concurrently during transcoding, which comprises steps of:
        (a) reading metadata of the media file to retrieve media file duration and video resolution and calculating a total length of the transcoded media file as a division of a product of the media duration and the video resolution by a preconfigured value;
        (b) determining a size of remaining transcoded media file as the total length of the transcoded media file and a size of a transcoded data fragment according to a bit rate of the media file;
        (c) transcoding a data chunk from a plurality of data chunks related to the media file from the first coding format respectively to a transcoded data fragment in the second coding format with a start position and an end position for positioning the transcoded data fragment in the transcoded media file relative to a beginning of the transcoded media file and calculating a size of the transcoded data fragment;
        (d) reducing the calculated size of the transcoded data fragment from the size of remaining transcoded media file;
        (e) sending the transcoded data fragment over the communication network for stream viewing on the media player while transcoding a next data chunk from said plurality of data chunks;
        (f) writing the transcoded data fragment into the transcoded media file in accordance with the start position and the end position relative to the beginning of the transcoded media file; and
        (g) repeating step (c) to step (f) until the size of remaining transcoded media file equals zero and all data chunks from said plurality of data chunks are transcoded to the second coding format and all respective transcoded data fragments are consecutively written into the transcoded media file; and
    storing the transcoded media file in a memory.

11. The server according to claim 10, wherein the media player comprises an HTML5 player.

12. The server according to claim 10, wherein the first coding format is selected from the group consisting of an NMF format, a standard codec, and a proprietary codec.

13. The server according to claim 10, wherein the second coding format comprises an H264 format.

14. The server according to claim 10, wherein the transcoded media file comprises a fragmented MP4 file.

15. The server according to claim 10, wherein the processor is configured to update the beginning of the media file in accordance with a seek time set by the user and updating the total length of the transcoded media file by reducing from the calculated total length of the transcoded media file the seek time in bytes.

16. The server according to claim 10, wherein the processor is configured to send an approximate file length of the transcoded media file and a time duration of the media file to the media player upon receiving the request.

17. The server according to claim 10, wherein the processor is configured to send an updated URL to the client terminal when all transcoded data fragments are written into the transcoded media file specifying a storage location of the transcoded media file.

18. The server according to claim 17, wherein the updated URL permits the playback of a fragmented transcoded media file.

19. The method of claim 6, wherein the seek time in bytes is a product of the total length of the transcoded media file and a division of the seek time by the retrieved duration of the media file.

20. The server according to claim 15, wherein the seek time in bytes is a product of the total length of the transcoded media file and a division of the seek time by the retrieved duration of the media file.

* * * * *